(12) United States Patent
Chino

(10) Patent No.: US 10,165,163 B2
(45) Date of Patent: Dec. 25, 2018

(54) IMAGE PICKUP APPARATUS INCLUDING MECHANISM FOR ATTACHING AND DETACHING TRANSPARENT COVER, IMAGE PROCESSING METHOD THEREOF, AND STORAGE MEDIUM

(71) Applicant: CANON KABUSHIKI KAISHA, Tokyo (JP)

(72) Inventor: Shunsuke Chino, Wako (JP)

(73) Assignee: Canon Kabushiki Kaisha, Tokyo (JP)

( * ) Notice: Subject to any disclaimer, the term of this patent is extended or adjusted under 35 U.S.C. 154(b) by 246 days.

(21) Appl. No.: 14/803,921

(22) Filed: Jul. 20, 2015

(65) Prior Publication Data
US 2016/0028973 A1   Jan. 28, 2016

(30) Foreign Application Priority Data

Jul. 23, 2014   (JP) ................................. 2014-149720

(51) Int. Cl.
*H04N 5/00*    (2011.01)
*H04N 5/225*   (2006.01)
(Continued)

(52) U.S. Cl.
CPC ......... *H04N 5/2254* (2013.01); *H04N 5/2252* (2013.01); *H04N 5/3572* (2013.01); *H04N 7/181* (2013.01)

(58) Field of Classification Search
CPC .... H04N 7/18; H04N 5/2253; H04N 5/23212; H04N 5/2251; H04N 5/238; H04N 5/232;
(Continued)

(56) References Cited

U.S. PATENT DOCUMENTS

| 4,833,534 A | * | 5/1989 | Paff | ........................ | H04N 7/183 |
| | | | | | 348/151 |
| 8,582,024 B2 | * | 11/2013 | Mori | ...................... | G02B 7/003 |
| | | | | | 348/373 |

(Continued)

FOREIGN PATENT DOCUMENTS

| CN | 101710942 B | * 11/2011 | ......... G02B 27/0025 |
| JP | 2004-320526 A | 11/2004 | |

(Continued)

OTHER PUBLICATIONS

Machine translation of CN 101710942.*

(Continued)

*Primary Examiner* — Frank F Huang
(74) *Attorney, Agent, or Firm* — Cowan, Liebowitz & Latman, P.C.

(57) ABSTRACT

An image pickup apparatus that is capable of suppressing degradation of image quality even when the orientation of a photographing lens is changed in a state in which a dome is attached to the image pickup apparatus. A dome attaching/detaching mechanism detachably holds a dome which is transparent and has a hemispherical shape. An image pickup unit is arranged inside the dome and is capable of changing an orientation of a lens group by a tilt mechanism. An image processor performs correction processing on an image photographed by the image pickup unit. The image processor performs image quality correction according to the orientation of the lens group.

21 Claims, 8 Drawing Sheets

(51) Int. Cl.
*H04N 7/18* (2006.01)
*H04N 5/357* (2011.01)

(58) Field of Classification Search
CPC .......... H04N 7/183; H04N 5/22; G03B 13/34; G03B 15/00; G03B 17/561; G03B 17/565; G03B 7/095; G03B 37/02; G08B 13/19636; G08B 29/20
See application file for complete search history.

(56) References Cited

U.S. PATENT DOCUMENTS

2004/0109080 A1\* 6/2004 Chan .................. H04N 5/23212
348/345
2009/0303325 A1\* 12/2009 Mizuno .................... G03B 3/10
348/143
2013/0272690 A1\* 10/2013 Aoki ...................... G03B 7/095
396/257

FOREIGN PATENT DOCUMENTS

| JP | 2008-017258 A | 1/2008 |
| JP | 2012-037574 A | 2/2012 |
| JP | 2012-083464 A | 4/2012 |

OTHER PUBLICATIONS

May 8, 2018 Japanese Patent Office Action, which is enclosed, without translation, that issued in Japanese Patent Application No. 2014-149720.

\* cited by examiner

FIG. 4

◆ ZOOM POSITION: TELE END, FOCUS: INFINITY, DIAPHRAGM: OPEN

| TILT POSITION [°] | GAMMA | SHARPNESS | SATURATION | ABERRATION CORRECTION | NR | |
|---|---|---|---|---|---|---|
| 0: HORIZON | 100 | 100 | 100 | 95 | 97 | LARGE |
| 10 | 95 | 90 | 97 | 92 | 94 | ↑ |
| 20 | 90 | 80 | 94 | 89 | 91 | IMAGE QUALITY CORRECTION |
| 30 | 85 | 70 | 91 | 86 | 88 | |
| 40 | 80 | 60 | 88 | 83 | 85 | |
| 50 | 75 | 50 | 85 | 80 | 82 | ↓ |
| 60 | 70 | 40 | 82 | 77 | 79 | |
| 70 | 65 | 30 | 79 | 74 | 76 | |
| 80 | 60 | 20 | 76 | 71 | 73 | |
| 90: ZENITH | 55 | 10 | 73 | 68 | 70 | SMALL |

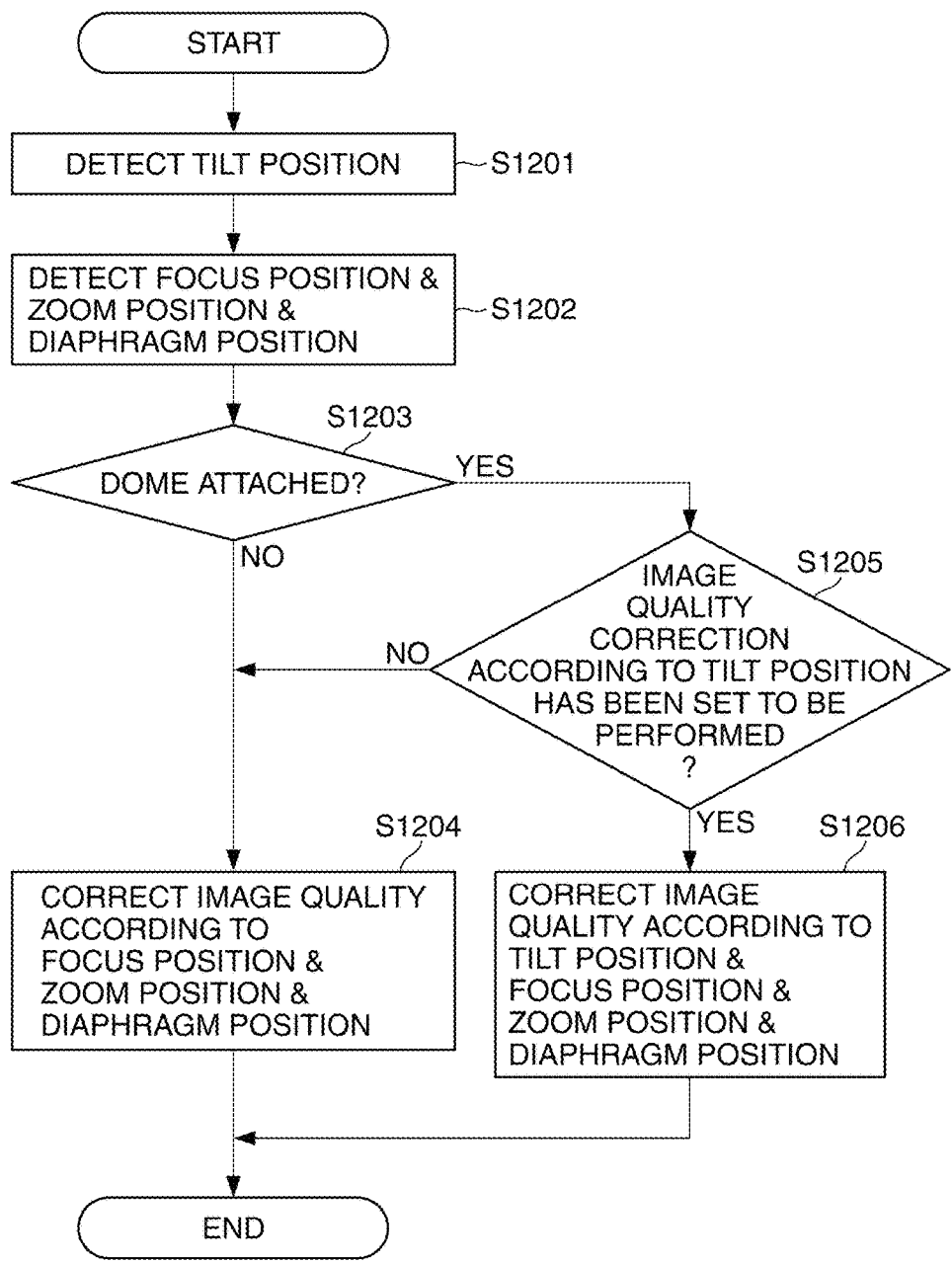

IMAGE PICKUP APPARATUS INCLUDING MECHANISM FOR ATTACHING AND DETACHING TRANSPARENT COVER, IMAGE PROCESSING METHOD THEREOF, AND STORAGE MEDIUM

BACKGROUND OF THE INVENTION

Field of the Invention

The present invention relates to an image pickup apparatus, an image processing method thereof, and a storage medium, and more particularly to image quality correction in the image pickup apparatus including a mechanism for attaching and detaching a dome-shaped transparent cover.

Description of the Related Art

Conventionally, a monitoring camera has been known which is covered with a hemispherical transparent cover (hereinafter simply referred to as "the dome") e.g. for appearance-improving, dust-proofing, rain-proofing, and splash-proofing purposes. In such a monitoring camera, due to a higher magnification function and a smaller size of a lens and a higher pixel density of an image pickup device, the influence of the dome exerted on the quality of images monitored thereby has become innegligible. For example, there can be variations between individual products of the camera caused by deviation (eccentricity) of the rotation axis of a tilt mechanism of the camera from the central axis of the hemispherical dome, nonuniformity of the thickness of the dome due to manufacturing variation, and so forth. This can cause degradation of image quality, such as defocus, and decrease in resolution lines in spite of being properly focused. Further, in some cases, the above problems occur due to a change in curvature of the dome. To solve such problems, there has been disclosed in Japanese Laid-Open Patent Publication No. 2012-83464 a technique in which a diaphragm is changed to a more closed state as the tilt position of the camera is moved from a zenith direction of the dome toward a horizontal direction.

However, in the technique disclosed in Japanese Laid-Open Patent Publication No. 2012-83464, mere reduction of lens aberration is performed in a state in which the dome is attached, and there still occurs degradation of image quality, such as diffraction, and sufficient correction is not performed. Since a technique associated with higher pixel density, such as full high definition, has been developed, the demand for higher resolution has been increased. Therefore, depending on a degree of degradation of image quality occurring as mentioned above, it sometimes occurs that mere correction of the diaphragm does not ensure sufficient image quality. Further, the stopping-down of the diaphragm generates images having much noise.

SUMMARY OF THE INVENTION

The present invention provides an image pickup apparatus that is capable of suppressing degradation of image quality even when the orientation of a photographing lens is changed in a state in which a dome is attached to the image pickup apparatus, an image processing method thereof, and a storage medium.

In a first aspect of the present invention, there is provided an image pickup apparatus comprising a holding unit that is configured to hold a cover member which is transparent and has a hemispherical shape, an image pickup unit that is arranged inside the cover member held by the holding unit, and is configured to be capable of changing an orientation of a photographing lens by a tilt mechanism, and a correction unit that is configured to perform correction processing on an image photographed by the image pickup unit, wherein the correction unit performs image quality correction according to the orientation of the photographing lens.

In a second aspect of the present invention, there is provided an image processing method for an image pickup apparatus that includes a holding unit holding a cover member which is transparent and has a hemispherical shape, and an image pickup unit that is arranged inside the cover member held by the holding unit, and is capable of changing an orientation of a photographing lens by a tilt mechanism, comprising performing correction processing on an image photographed by the image pickup unit, wherein the correction processing includes image quality correction according to an orientation of the photographing lens.

In a third aspect of the present invention, there is provided a non-transitory computer-readable storage medium storing a program for causing a computer to execute an image processing method for an image pickup apparatus that includes a holding unit holding a cover member which is transparent and has a hemispherical shape, and an image pickup unit that is arranged inside the cover member held by the holding unit, and is capable of changing an orientation of a photographing lens by a tilt mechanism, wherein the image processing method comprises performing correction processing on an image photographed by the image pickup unit, wherein the correction processing includes image quality correction according to an orientation of the photographing lens.

According to the present invention, it is possible to suppress degradation of image quality even when the orientation of a photographing lens is changed in a state in which the dome is attached thereto, and obtain an optimum image quality according to a distance between the photographing lens and the dome, and a curvature and a thickness of the dome.

Further features of the present invention will become apparent from the following description of exemplary embodiments (with reference to the attached drawings).

BRIEF DESCRIPTION OF THE DRAWINGS

FIGS. 2A and 2B are views showing positional relationships between a lens group and a dome when a tilt mechanism of the image pickup apparatus shown in FIG. 1 is driven for tilting, in which FIG. 2A shows a state in which the lens group is oriented in a zenith direction of the dome, and FIG. 2B shows a state in which the lens group is oriented in a horizontal direction of the dome.

FIG. 4 is a diagram showing an example of degrees of image quality correction dependent on a tilt position.

FIG. 5 is a flowchart of an image quality correction process performed by an image pickup apparatus according to a second embodiment of the present invention.

DESCRIPTION OF THE EMBODIMENTS

The present invention will now be described in detail below with reference to the accompanying drawings showing embodiments thereof.

Figure 1:
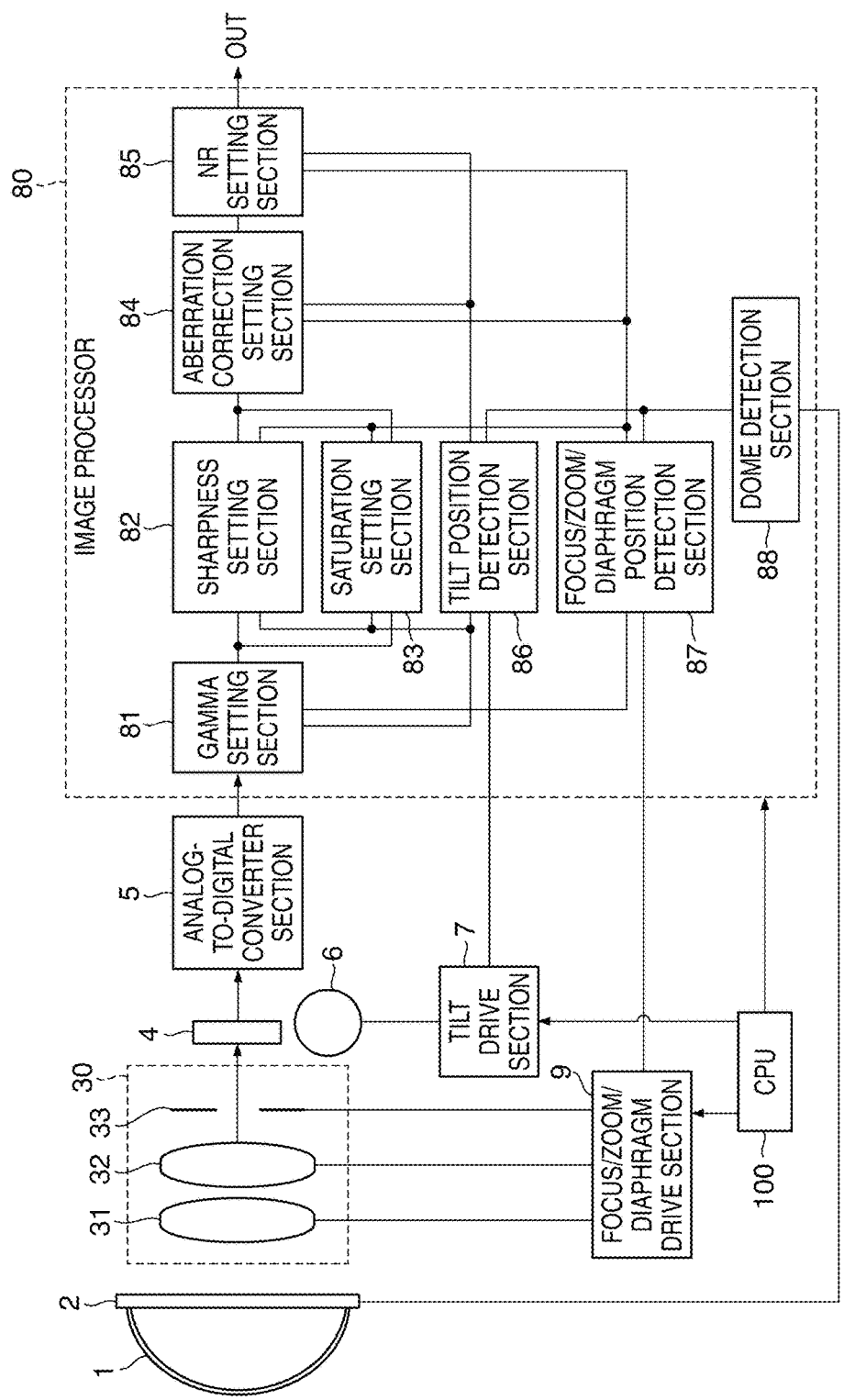
FIG. 1 is a schematic block diagram of an image pickup apparatus according to a first embodiment of the present invention.

FIG. 1 is a schematic block diagram of an image pickup apparatus according to a first embodiment of the present invention.

The image pickup apparatus shown in FIG. 1 is a monitoring camera that is installed, for example, on a ceiling of a room or on an inverted L-shaped support provided at an outdoor location. The image pickup apparatus includes a dome 1 that is a hemispherical transparent cover member, and is used for water-proofing, splash-proofing, and dust-proofing the image pickup apparatus, and a dome attaching/detaching mechanism 2 that is a holding mechanism that detachably holds the dome 1.

A lens group 30 is comprised of a zoom lens 31, a focus lens 32, and a diaphragm 33. The zoom lens 31 is a lens for magnification. The focus lens 32 is a lens for focusing. The diaphragm 33 is for performing light amount adjustment on light incident on an image pickup device 4. The zoom lens 31, the focus lens 32, and the diaphragm 33 are driven by a focus/zoom/diaphragm drive section 9.

The image pickup device 4 converts light passed through the dome 1 and the lens group 30 to electric signals. The electric signals output from the image pickup device 4 are subjected to analog-to-digital conversion by an analog-to-digital converter section 5, and are input to an image processor 80.

A tilt mechanism 6 is disposed inside the dome 1, and is movable (capable of being driven for tilting) as desired between the zenith direction and the horizontal direction of the dome 1. The tilt mechanism 6 is driven by a tilt drive section 7.

The image processor 80 includes a gamma setting section 81, a sharpness setting section 82, a saturation setting section 83, an aberration correction setting section 84, a NR (noise reduction) setting section 85, a tilt position detection section 86, a focus/zoom/diaphragm position detection section 87, and a dome detection section 88.

Figure 7:
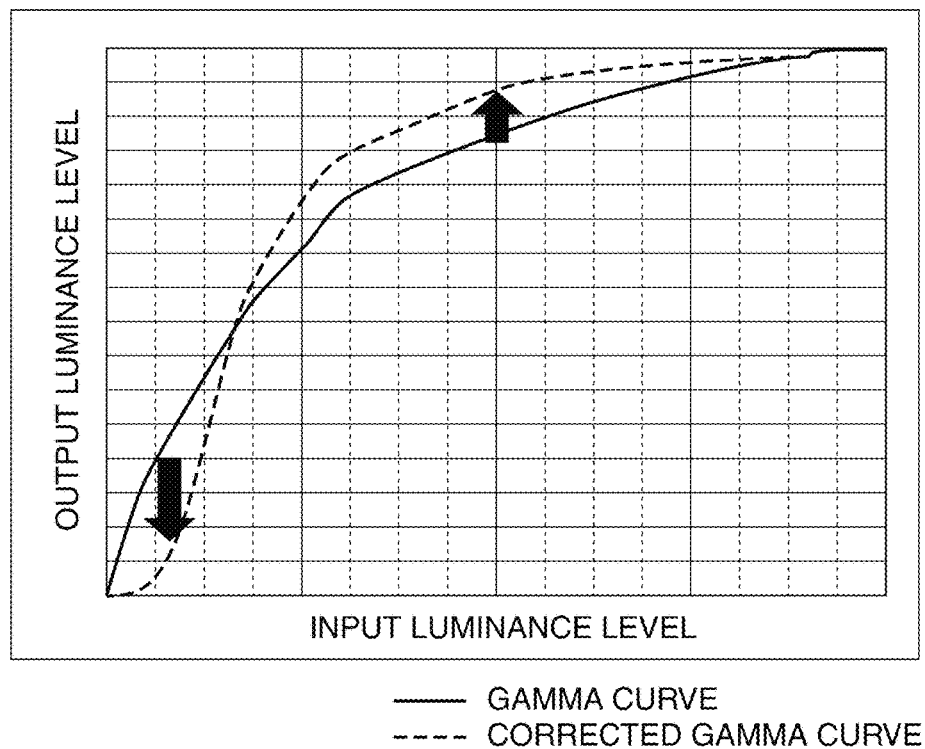
FIG. 7 is a diagram showing an example of a gamma curve before correction and a gamma curve after correction.

The gamma setting section 81 corrects a luminance level and a color difference level of an output image with respect to an input image of the image processor 80. An example of correction of the luminance level by the gamma setting section 81 is shown in FIG. 7. The horizontal axis and vertical axis of a graph shown in FIG. 7 represent an input luminance level and an output luminance level, respectively. The solid line and broken line of the graph shown in FIG. 7 represent a gamma curve and a corrected gamma curve, respectively.

The sharpness setting section 82 performs edge enhancement of an image to adjust the sense of resolution of the image.

The saturation setting section 83 adjusts the hue and saturation of an output image with respect to an input image.

The aberration correction setting section 84 performs aberration correction, such that magnification chromatic aberration, axial color aberration, and the like, which are optically generated in an input image, are corrected in an output image.

The NR setting section 85 performs noise reduction of an output image with respect to an input image.

The tilt position detection section 86 receives an output signal from the tilt drive section 7 to detect a tilt position (tilt angle) of the lens group 30. Further, the tilt position detection section 86 notifies the detected tilt position to the gamma setting section 81, the sharpness setting section 82, the saturation setting section 83, the aberration correction setting section 84, and the NR setting section 85. The tilt position represents an orientation of the lens group 30 between the zenith direction and the horizontal direction of the dome 1. For example, as shown in FIG. 4, the tilt position may be expressed by an angle of the orientation of the lens group 30 which is measured from the horizontal direction of the lens group 30, which is defined as 0°, up to the zenith direction of the same, which is defined as 90°, or may be expressed by any other suitable method.

The focus/zoom/diaphragm position detection section 87 receives an output signal from the focus/zoom/diaphragm drive section 9 to detect positions of the zoom lens 31 and the focus lens 32, and a state of the diaphragm 33. Further, the focus/zoom/diaphragm position detection section 87 notifies information on the focus position, the zoom position, and the diaphragm position to the gamma setting section 81, the sharpness setting section 82, the saturation setting section 83, the aberration correction setting section 84, and the NR setting section 85, depending on whether or not the dome 1 is attached.

The above-mentioned sections from the gamma setting section 81 to the NR setting section 85 perform various processes according to the tilt position notified from the tilt position detection section 86, and the focus position and the zoom position notified from the focus/zoom/diaphragm position detection section 87.

The dome detection section 88 determines whether or not the dome 1 is attached to the dome attaching/detaching mechanism 2 to notify the tilt position detection section 86 and the focus/zoom/diaphragm position detection section 87 of a result of the determination. A CPU 100 supplies controls signals to the tilt drive section 7, the focus/zoom/diaphragm drive section 9, and the image processor 80 to control the operations of them.

Next, a description will be given of a positional relationship between the lens group 30 and the dome 1 of the image pickup apparatus shown in FIG. 1 when the tilt mechanism 6 is driven for tilting, with reference to FIGS. 2A and 2B.

In the image pickup apparatus shown in FIG. 1, light passing through the dome 1 and the lens group 30 is incident on the image pickup device 4. Therefore, to excellently maintain optical characteristics, such as the number of resolution lines, regardless of the tilt position, it is important that a distance between the lens group 30 and the dome 1, a curvature of the dome 1, and a thickness of the dome 1 satisfy predetermined relationships.

Figure 2A:
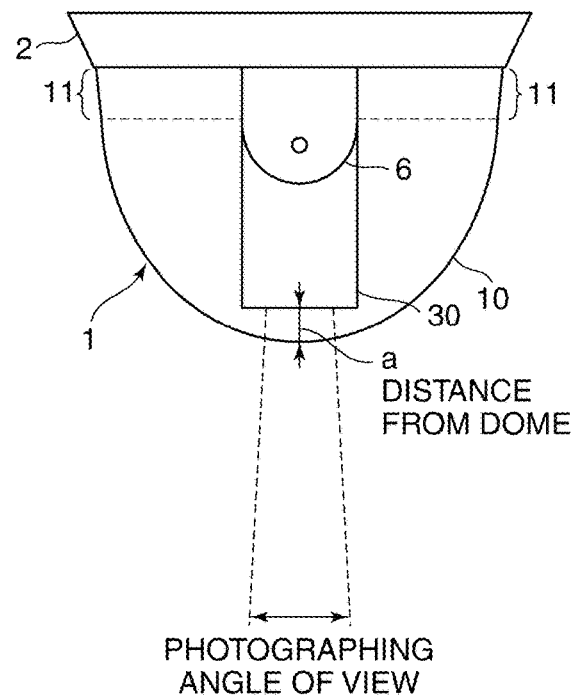
Figure 2B:
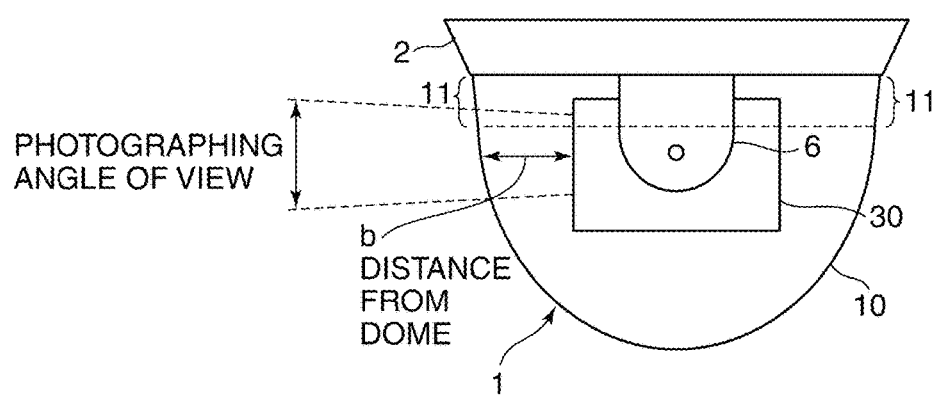
Figure 6A:
FIG. 6A is a diagram showing an example of an image degraded in image quality due to attachment of the dome.

However, for example, as shown in FIGS. 2A and 2B, due to a difference between an axis of rotation of the tilt mechanism 6 and a central axis of the dome 1, the distance between the lens group 30 and the dome 1 sometimes changes according to the tilt position. Further, as to the dome 1, for manufacturing reasons, the curvature varies between a curvature portion 10 and a draft portion 11, and the thickness of the dome 1 is not uniform due to individual product variations and design errors. Consequently, as shown in FIG. 6A, there is a fear that the image quality is degraded according to the tilt position. In the case of defocus, the image quality can be improved by adjusting the point of focus again. However, in the case of degradation of resolution lines caused by optical characteristics, the image quality cannot be improved by mere adjustment of the point of focus, but it is required to change the processing performed by the image processor 80.

Figure 6B:
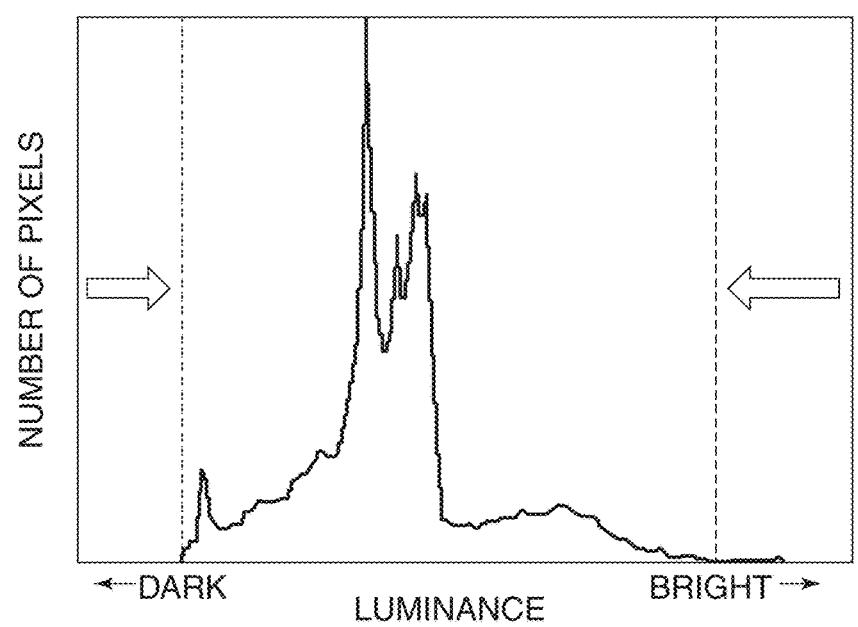
FIG. 6B is a diagram showing an example of a histogram of the image degraded in image quality shown in FIG. 6A.
Figure 8A:
FIG. 8A is a diagram showing an example of an image improved by gamma correction.

The image degraded in image quality appears to be out of focus as a whole. In a histogram of the image, as shown in FIG. 6B, pixels are somewhat gathered in an intermediate area. To overcome this problem, the gamma setting section 81 performs gamma correction as shown in FIG. 7 on the image shown in FIG. 6A, which makes it possible to obtain an image improved in contrast as shown in FIG. 8A.

Figure 8B:
FIG. 8B is a diagram showing an example of an image improved in sharpness.

The image degraded in image quality is reduced in high frequency components, so that the edge of the image becomes blurred. To overcome this problem, the sharpness setting section 82 emphasizes sharpness, which makes it possible to improve the sense of resolution of the image, as shown in FIG. 8B. Further, the saturation setting section 83 adjusts saturation and hue, which makes it possible to enhance image recognizability based on colors.

The aberration is a phenomenon in which an edge portion of an area where a luminance difference is large is colored, and the aberration tends to become larger as the location is closer to a periphery of the image. Occurrence of an aberration not only spoils the quality of the image, but also, in worse cases, it becomes impossible to express details of the image due to the aberration, whereby the recognizability of characters or a face is sometimes reduced. Correction processing performed by the gamma setting section 81, the sharpness setting section 82, and the saturation setting section 83 basically emphasizes the aberration as well, and hence assuming that the image is largely corrected by the correction processing, degradation of the image due to the aberration is increased. Therefore, an optimum aberration correction value is required to be set by the aberration correction setting section 84.

Similar to the aberration, when larger corrections are made by the gamma setting section 81, the sharpness setting section 82, and the saturation setting section 83, this basically increases noise as well. Therefore, an optimum noise reduction correction value is required to be set by the NR setting section 85.

Further, among factors causing degradation of image quality, an optical factor is large, and hence the degradation of image quality is affected by the zoom position, the focus position, the diaphragm position, and whether or not the dome 1 is attached. Therefore, it is possible to realize more excellent image quality by causing the gamma setting section 81, the sharpness setting section 82, the saturation setting section 83, the aberration correction setting section 84, and the NR setting section 85 to properly set correction values, according to the zoom position, the focus position, the diaphragm position, and whether or not the dome is attached.

Note that a description is omitted of a proper value of each of the respective correction values by the gamma setting section 81, the sharpness setting section 82, the saturation setting section 83, the aberration correction setting section 84, and the NR setting section 85.

Figure 3:
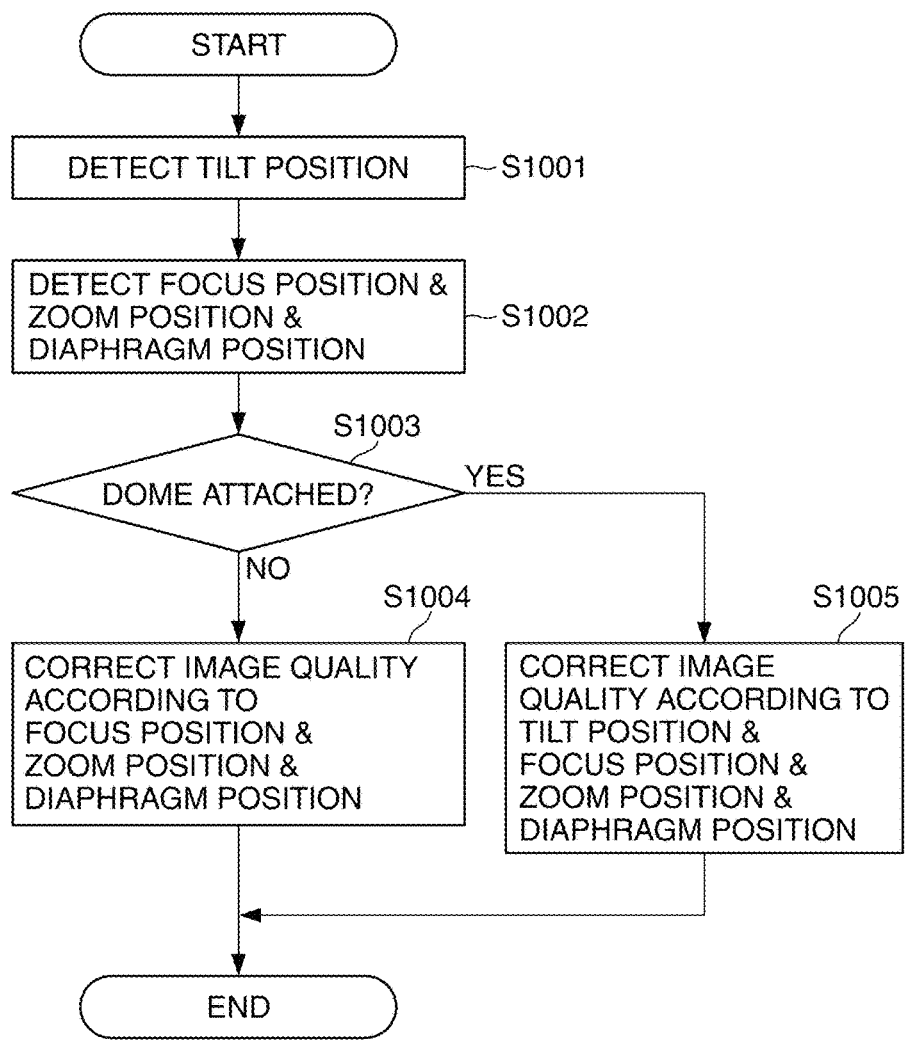
FIG. 3 is a flowchart of an image quality correction process performed by the image pickup apparatus shown in FIG. 1.

FIG. 3 is a flowchart of an image quality correction process performed by the image pickup apparatus in FIG. 1. The image quality correction process shown in FIG. 3 is performed by the image processor 80.

First, in a step S1001, the tilt position detection section 86 detects a tilt position by an output signal from the tilt drive section 7.

Next, the focus/zoom/diaphragm position detection section 87 detects a focus position, a zoom position, and a diaphragm position according to output signals from the focus/zoom/diaphragm drive section 9 (step S1002).

Next, the dome detection section 88 determines whether or not the dome 1 is attached to the dome attaching/detaching mechanism 2 (step S1003). This determination may be performed by determining whether or not a user has made a setting indicative of an attached state of the dome 1 for the image pickup apparatus, or may be performed by providing the dome attaching/detaching mechanism 2 with a sensor for detecting an attached state of the dome 1, and determining based on an output from the sensor.

If it is determined in the step S1003 that the dome 1 is not attached, image quality correction is performed according to the focus position, the zoom position, and the diaphragm position (step S1004). In this image quality correction, the above-mentioned image quality correction is performed by at least one of the gamma setting section 81, the sharpness setting section 82, the saturation setting section 83, the aberration correction setting section 84, and the NR setting section 85, based on the focus position, the zoom position, and the diaphragm position. Note that the image quality correction may be differentiated according to at least one of the zoom position, the focus position, and the diaphragm position.

On the other hand, if it is determined in the step S1003 that the dome 1 is attached, image quality correction is performed based on the tilt position, in addition to the focus position, the zoom position, and the diaphragm position (step S1005). In this image quality correction, for example, according to a plurality of tables, one of which is shown in FIG. 4, the above-mentioned image quality correction is performed by at least one of the gamma setting section 81, the sharpness setting section 82, the saturation setting section 83, the aberration correction setting section 84, and the NR setting section 85. Note that the image quality correction may be differentiated according to at least one of the zoom position, the focus position, and the diaphragm position.

When the dome 1 is attached, in a case where the image quality correction is performed with reference to an orientation of the photographing lens in the zenith direction of the dome 1, the image quality is often degraded as the orientation of the photographing lens is shifted from the zenith direction of the dome 1 to the horizontal direction of the same. Therefore, in a case where the image quality correction is performed with reference to a tilt position corresponding to the zenith direction of the dome 1, it is preferable to improve the image quality by increasing the degree of image quality correction as the tilt position is shifted from the zenith direction of the dome 1 to the horizontal direction of the same.

On the other hand, when the dome 1 is attached, in a case where the image quality correction is performed with reference to a tilt position corresponding to the horizontal direction of the dome 1, it is preferable to improve the image quality by diminishing the image quality correction as the tilt position is shifted from the zenith direction of the dome 1 to the horizontal direction of the dome 1.

In a case where there are variations in the thickness of the dome 1 between individual products thereof, a difference from the design value thereof may be calculated on a dome-by-dome basis according to the tilt position, and the degree of image quality correction may be increased as the difference becomes larger.

The distance between the lens group 30 and the dome 1 when the lens group 30 is oriented in the zenith direction of the dome 1 is referred to as a first distance (distance "a" from the dome in FIG. 2A), and the distance between the lens group 30 and the dome 1 when the lens group 30 is oriented in the horizontal direction of the dome 1 is referred to as a second distance (distance "b" from the dome in FIG. 2B). The degree of image quality correction may be made larger when the distance between the lens group 30 and the dome 1 is equal to the distance "b" than when the same is equal to the distance "a". Further, assuming that the distance between the lens group 30 and the dome 1 is reduced as the orientation of the lens group 30 is shifted from the horizontal direction toward the zenith direction of the dome 1, the degree of image quality correction may be increased as the distance between the lens group 30 and the dome 1 is increased.

Further, when the distance between the lens group 30 and the dome 1 is equal to the distance "a", the degree of image quality correction may be made equal between a case where the dome 1 is attached to the dome attaching/detaching mechanism 2 and a case where the dome 1 is not attached to the dome attaching/detaching mechanism 2. Further, when the distance between the lens group 30 and the dome 1 is equal to the distance "b", the degree of image quality correction may be made different between the case where the dome 1 is attached to the dome attaching/detaching mechanism 2 and the case where the dome 1 is not attached to the dome attaching/detaching mechanism 2.

Further, the image quality correction may be performed such that the degree of image quality correction is made larger when the distance between the lens group 30 and the dome 1 is equal to the distance "b" than when the same is equal to the distance "a".

FIG. 4 shows an example of degrees of image quality correction dependent on the tilt position.

FIG. 4 is a table of settings (degrees) of correction of gamma, sharpness, saturation, aberration, and noise reduction, which are associated with the tilt position in a case where the zoom position is at a telephoto end, the focus position is at infinity, and the diaphragm position is at an open position.

Although the table shown in FIG. 4 shows settings of the corrections in a case where the zoom position is at a telephoto end, the focus position is at infinity, and the diaphragm is at an open position, there may be provided a plurality of tables each containing settings of the corrections configured according to the zoom position, the focus position, and the diaphragm position, as parameters. For example, as to the zoom position, the degradation of resolution is larger at a zoom position closer to the telephoto end than at a zoom position closer to a wide angle end, and hence it is preferable to improve image quality by increasing each of the respective degrees of correction of gamma, sharpness, saturation, aberration, and noise reduction, as the zoom position is shifted from the wide angle end to the telephoto end.

On the other hand, as to the focus position, the degradation of resolution is lager at a focus position closer to the closest distance than at a focus position closer to infinity, and hence it is preferable to improve image quality by increasing each of the respective degrees of correction of gamma, sharpness, saturation, aberration, and noise reduction, as the focus position is shifted from the infinity to the closest distance.

According to the above embodiment, it is possible to obtain an optimum image quality according to the distance between the photographing lens and the dome and the curvature and thickness of the dome, by changing the degree of image quality correction according to the tilt position of the photographing lens when the dome is attached. Further, it is possible to suppress degradation of image quality when the dome is attached by changing the degree of image quality correction according to whether or not the dome is attached.

Next, a second embodiment of the present invention will be described. An image pickup apparatus according to the second embodiment has the same arrangement as that of the first embodiment described hereinabove. Therefore, components corresponding to those of the first embodiment are denoted by the same reference numerals, and description thereof is omitted. The following description will be given only of different points from the first embodiment.

Referring to FIGS. 2A and 2B, the dome 1 is formed by the curvature portion 10 (first portion) having a constant curvature on a smooth curved surface, and the draft portion 11 (second portion) which is formed continuously with the curvature portion 10 and includes a curved surface different in curvature from the curvature portion 10. Alternatively, the draft portion 11 may be configured to include a linear and planar surface, which is not a curved surface. Therefore, when the angle of view of the photographing lens (also simply referred to as "the photographing view angle") is within a range extending over the curvature portion 10 and the draft portion 11 or within a range of the draft portion 11, there is a fear that the image quality is degraded. To overcome this problem, as shown in FIG. 2B, when the photographing view angle is within a range extending over the curvature portion 10 and the draft portion 11 or within a range of the draft portion 11, the degree of image quality correction is increased to prevent image quality degradation. Note that FIGS. 2A and 2B show a cross section of the dome 1, and the curvature portion 10 is represented by a curved line and the draft portion 11 is represented by a straight line.

FIG. 5 is a flowchart of an image quality correction process performed by the image pickup apparatus according to the second embodiment. The image quality correction process shown in FIG. 5 is performed by the image processor 80.

First, in a step S1201, the tilt position detection section 86 detects a tilt position of the lens group 30 based on an output signal from the tilt drive section 7.

Next, the focus/zoom/diaphragm position detection section 87 detects a focus position, a zoom position, and a diaphragm position based on output signals from the focus/zoom/diaphragm drive section 9 (step S1202).

Next, the dome detection section 88 determines whether or not the dome 1 is attached to the dome attaching/detaching mechanism 2 (step S1203). Similar to the step S1003 in FIG. 3, this determination may be performed by determining whether or not a user has made a setting indicative of an attached state of the dome 1 for the image pickup apparatus, or may be performed by providing the dome attaching/detaching mechanism 2 with a sensor for detecting an attached state of the dome 1, and determining based on an output from the sensor.

If it is determined in the step S120 that the dome 1 is not attached 3, similar to the step S1004 in FIG. 3, image quality correction is performed according to the focus position, the zoom position, and the diaphragm position (step S1204).

On the other hand, if it is determined in the step S1203 that the dome 1 is attached, the tilt position detection section 86 determines whether or not image quality correction according to the tilt position has been set to be performed (step S1205). If the image quality correction according to the tilt position has not been set to be performed, the process proceeds to the step S1204.

On the other hand, it is determined in the step S1205 that the image quality correction according to the tilt position has been set to be performed, the image quality correction according to the tilt position is performed in addition to those according to the focus position, zoom position, and the diaphragm position (step S1206).

As described above, since the image quality is degraded if an extent of view defined by the photographing view angle overlaps an area where the curvature of the curved surface of the dome 1 is different, it is preferable to increase the degrees of corrections by gamma correction, sharpness, and saturation. Further, in a case where a degraded condition of image quality varies with an amount of overlap with an area where the curvature of the curved surface of the dome 1 is different, the degree of image quality correction may be changed according to the amount of overlap. In general, the image quality is adjusted in a manner adjusted to the curvature portion 10, the degree of image quality correction may be increased as the amount of overlap of the extent of view defined by the photographing image angle with the draft portion 11 is larger.

Further, when the photographing view angle is within a range of the curvature portion 10, the degree of image quality correction may be made equal between a case where the dome 1 is attached to the dome attaching/detaching mechanism 2 and a case where the dome 1 is not attached to the dome attaching/detaching mechanism 2. Further, when the photographing view angle is within a range extending over the curvature portion 10 and the draft portion 11, or within a range of the draft portion 11, the degree of image quality correction may be made different between a case where the dome 1 is attached to the dome attaching/detaching mechanism 2 and a case where the dome 1 is not attached to the dome attaching/detaching mechanism 2.

Further, the image quality correction may be performed such that the degree of image quality correction is made larger in a case where the angle of view of the photographing lens passes a range within the draft portion 11 than in a case where the angle of view of the photographing lens passes a range within the curvature portion 10.

Further, the image quality correction may be performed such that the difference in the degree of image quality correction between a case where the dome 1 is attached and a case where the dome 1 is not attached becomes larger in a case where the angle of view of the photographing lens passes a range within the draft portion 11 than in a case where the angle of view of the photographing lens passes a range within the curvature portion 10.

According to the above embodiment, it is possible to obtain an optimum image quality according to the distance between the photographing lens and the dome, and the curvature and thickness of the dome, by changing the degree of image quality correction according to the tilt position of the photographing lens in a case where the dome is attached. Further, it is possible to suppress image quality degradation in a case where the dome is attached, by changing the degree of image quality correction according to whether or not the dome is attached.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

This application claims the benefit of Japanese Patent Application No. 2014-149720 filed Jul. 23, 2014 which is hereby incorporated by reference herein in its entirety.

What is claimed is:
1. An image pickup apparatus comprising:
a holding mechanism that holds a cover member which is transparent and has a curved surface, the cover member comprising a first portion having a constant curvature and a second portion formed continuously with the first portion and including a curved surface different in curvature from the first portion or a flat surface that is not curved;
an image pickup unit, including a photographing lens and an image pickup device, that is arranged inside the cover member held by said holding mechanism, wherein a tilt position of the photographing lens is capable of being changed by a tilt mechanism; and
an image processing circuit that inputs an image signal outputted from the image pickup device after capturing the image signal and performs, on the inputted image signal, image processing for correcting image quality of the inputted image signal, according to the tilt position of the photographing lens changed by the tilt mechanism;
wherein the image processing for correcting image quality of the inputted image signal includes at least one of respective corrections of sharpness, gamma, saturation, aberration, and noise reduction, wherein the image processing performed on the inputted image signal varies based on the tilt position of the photographing lens, wherein an amount of image processing performed on the inputted image signal is based on an angle of the photographing lens corresponding to the tilt position, and wherein in a case where the cover member is attached to said holding mechanism, the image processing circuit performs the image processing for correcting the image quality of the inputted image signal such that the amount of image processing for correcting the image quality is larger when an angle of view of the photographing lens is within a range extending over the first portion and the second portion or within a range of the second portion than when the angle of view of the photographing lens is within a range of the first portion of the cover member.

2. The image pickup apparatus according to claim 1, wherein said holding mechanism detachably holds the cover member, and wherein the image processing circuit changes the image processing for correcting image quality of the inputted image signal according to whether or not the cover member is attached to said holding mechanism.

3. The image pickup apparatus according to claim 1, wherein the second portion is at a location closer to said holding mechanism than the first portion is.

4. The image pickup apparatus according to claim 1, wherein assuming that in a state in which the cover member is attached to said holding mechanism, a tilt position of the photographing lens when an angle of view of the photographing lens is within the range of the first portion is defined as a first tilt position, and a tilt position of the photographing lens when the angle of view of the photographing lens is within the range extending over the first portion and the second portion or within the range of the second portion is defined as a second tilt position, the image processing circuit makes, when the tilt position of the photographing lens is the second tilt position, the degree amount of image processing for correcting the image quality different between a case where the cover member is attached to said holding mechanism and a case where the cover member is not attached to said holding mechanism.

5. The image pickup apparatus according to claim 4, wherein the image processing circuit makes a difference between the amount of image processing for correcting the image quality in a case where the cover member is attached to said holding mechanism and the amount of image processing for correcting the image quality in a case where the cover member is not attached to said holding mechanism, larger, when the tilt position of the photographing lens is the second tilt position than when the tilt position of the photographing lens is the first tilt position.

6. The image pickup apparatus according to claim 1, wherein the image processing circuit makes the image processing for correcting the image quality of the inputted image signal different according to at least one of a zoom position, a focus position, and a diaphragm position, as well as the tilt position of the photographing lens.

7. The image pickup apparatus according to claim 6, wherein the image processing circuit performs the image processing for correcting the image quality of the inputted image signal such that the amount of image processing for correcting the image quality is larger as the zoom position is shifted from a wide angle end to a telephoto end.

8. The image pickup apparatus according to claim 6, wherein the image processing circuit performs the image processing for correcting the image quality of the inputted image signal such that the amount of image processing for correcting the image quality is larger as the focus position is shifted from infinity to a closest distance.

9. An image processing method for an image pickup apparatus that includes a holding mechanism holding a cover member which is transparent and has a curved surface, the cover member comprising a first portion having a constant curvature, and a second portion formed continuously with the first portion and including a curved surface different in curvature from the first portion or a flat surface that is not curved, and an image pickup unit, including a photographing lens and an image pickup device, that is arranged inside the cover member held by the holding mechanism, wherein a tilt position of the photographing lens is capable of being changed by a tilt mechanism, comprising:

inputting an image signal outputted from the image pickup device after capturing the image signal; and performing, on the inputted image signal, image processing for correcting image quality of the inputted image signal, according to the tilt position of the photographing lens changed by the tilt mechanism;

wherein the image processing for correcting image quality of the inputted image signal includes the at least one of respective corrections of sharpness, gamma, saturation, aberration, and noise reduction, wherein the image processing performed on the inputted image signal varies based on the tilt position of the photographing lens;

wherein an amount of image processing performed on the inputted image signal is based on an angle of the photographing lens corresponding to the tilt position, and wherein in a case where the cover member is attached to said holding mechanism, the image processing for correcting the image quality of the inputted image signal is performed such that the amount of image processing for correcting the image quality is larger when an angle of view of the photographing lens is within a range extending over the first portion and the second portion or within a range of the second portion than when the angle of view of the photographing lens is within a range of the first portion of the cover member.

10. A non-transitory computer-readable storage medium storing a program for causing a computer to execute an image processing method for an image pickup apparatus that includes a holding mechanism holding a cover member which is transparent and has a curved shape, the cover member comprising a first portion having a constant curvature, and a second portion formed continuously with the first portion and including a curved surface different in curvature from the first portion or a flat surface that is not curved, and an image pickup unit, including a photographing lens and an image pickup device, that is arranged inside the cover member held by the holding mechanism, wherein a tilt position of the photographing lens is capable of being changed by a tilt mechanism, wherein the image processing method comprises:

inputting an image signal outputted from the image pickup device after capturing the image signal; and, performing, on the inputted image signal, image processing for correcting image quality of the inputted image signal according to the tilt position of the photographing lens changed by the tilt mechanism;

wherein the image processing for correcting image quality of the inputted image signal includes at least one of respective corrections of sharpness, gamma, saturation, aberration, and noise reduction, wherein the image processing performed on the inputted image signal varies based on the tilt position of the photographing lens;

wherein an amount of image processing performed on the inputted image signal is based on an angle of the photographing lens corresponding to the tilt position; and wherein in a case where the cover member is attached to said holding mechanism, the image processing for correcting the image quality of the inputted image signal is performed such that the amount of image processing for correcting the image quality is larger when an angle of view of the photographing lens is within a range extending over the first portion and the second portion or within a range of the second portion than when the angle of view of the photographing lens is within a range of the first portion of the cover member.

11. The image pickup apparatus according to claim 4, wherein the image processing circuit makes, when the tilt position of the photographing lens is the first tilt position, the amount of image processing for correcting the image quality equal between the case where the cover member is attached to said holding mechanism and the case where the cover member is not attached to said holding mechanism.

12. The image pickup apparatus according to claim 1, wherein a tilt axis of the tilt mechanism is deviated from a central axis of the curved surface, and change of the tilt position of the photograph lens changes a distance between the photographing lens and the cover member.

13. The image pickup apparatus according to claim 6, wherein said image processing circuit performs the processing for correcting image quality based on at least one table including corrections associated with the tilt position and according to at least one of the zoom position, the focus position, and the diaphragm position.

14. An image processing apparatus that uses an image photographed by an image pickup apparatus arranged inside a cover member, which is transparent and has a curved surface, the cover member comprising a first portion having a constant curvature, and a second portion formed continuously with the first portion and including a curved surface different in curvature from the first portion or a flat surface that is not curved, and including a photographing lens and an image pickup device, the image processing apparatus comprising:

an image processing circuit that inputs an image signal outputted from the image pickup apparatus and performs, on the inputted image signal, image processing for correcting image quality of the inputted image signal, according to a tilt position of the photographing lens changed by a tilt mechanism;

wherein the image processing for correcting image quality of the inputted image signal includes at least one of respective corrections of sharpness, gamma, saturation, aberration, and noise reduction, wherein the image processing performed on the inputted image signal varies based on the tilt position of the photographing lens, wherein an amount of image processing performed on the inputted image signal is based on an angle of the photographing lens corresponding to the tilt position; and wherein in a case where the cover member is attached to a holding mechanism, the image processing circuit performs the image processing for correcting the image quality of the inputted image signal such that the amount of image processing for correcting the image quality is larger when an angle of view of the photographing lens is within a range extending over the first portion and the second portion or within a range of the second portion than when the angle of view of the photographing lens is within a range of the first portion of the cover member.

15. An image processing method for an image processing apparatus that uses an image photographed by an image pickup apparatus arranged inside a cover member, which is transparent and has a curved surface, the cover member comprising a first portion having a constant curvature, and a second portion formed continuously with the first portion and including a curved surface different in curvature from the first portion or a flat surface that is not curved, and including a photographing lens and an image pickup device, the image processing method comprising:

inputting an image signal outputted from the image pickup apparatus; and performing, on the inputted image signal, image processing for correcting image quality of the inputted image signal, according to a tilt position of the photographing lens changed by a tilt mechanism;

wherein the image processing for correcting image quality of the inputted image signal includes at least one of respective corrections of sharpness, gamma, saturation, aberration, and noise reduction, wherein the image processing performed on the inputted image signal varies based on the tilt position of the photographing lens, wherein an amount of image processing performed on the inputted image signal is based on an angle of the photographing lens corresponding to the tilt position; and wherein in a case where the cover member is attached to a holding mechanism, the image processing for correcting the image quality of the inputted image signal is performed such that the amount of image processing for correcting the image quality is larger when an angle of view of the photographing lens is within a range extending over the first portion and the second portion or within a range of the second portion than when the angle of view of the photographing lens is within a range of the first portion of the cover member.

16. A non-transitory computer-readable storage medium storing a program for causing a computer to execute an image processing method for an image processing apparatus that uses an image photographed by an image pickup apparatus arranged inside a cover member, which is transparent and has a curved surface, the cover member comprising a first portion having a constant curvature, and a second portion formed continuously with the first portion and including a curved surface different in curvature from the first portion or a flat surface that is not curved, and including a photographing lens and an image pickup device, wherein the image processing method comprises:

inputting an image signal outputted from the image pickup apparatus; and performing, on the inputted image signal, image processing for correcting image quality of the inputted image signal, according to a tilt position of the photographing lens changed by a tilt mechanism;

wherein the image processing for correcting image quality of the inputted image signal includes at least one of respective corrections of sharpness, gamma, saturation, aberration, and noise reduction, wherein the image processing performed on the inputted image signal varies based on the tilt position of the photographing lens, wherein an amount of image processing performed on the inputted image signal is based on an angle of the photographing lens corresponding to the tilt position; and wherein in a case where the cover member is attached to a holding mechanism, the image processing for correcting the image quality of the inputted image signal is performed such that the amount of image processing for correcting the image quality is larger when an angle of view of the photographing lens is within a range extending over the first portion and the second portion or within a range of the second portion than when the angle of view of the photographing lens is within a range of the first portion of the cover member.

17. The image pickup apparatus according to claim 12, wherein assuming that the distance between the photographing lens and the cover member when the tilt position of the photographing lens is a third tilt position is defined as a first distance, and the distance between the photographing lens and the cover member when the tilt position of the photographing lens is a fourth tilt position is defined as a second distance, the image processing circuit performs the image processing such that the amount of image processing for correcting the image quality is larger as the distance between the photographing lens and the cover member comes closer to the second distance than when the distance between the photographing lens and the cover member is the first distance.

18. The image pickup apparatus according to claim 17, wherein the image processing circuit makes the amount of image processing for correcting the image quality different between a case where the cover member is attached to said holding mechanism and a case where the cover member is not attached to said holding mechanism, when the tilt position of the photographing lens is the fourth tilt position.

19. The image pickup apparatus according to claim 17, wherein the image processing circuit performs the image processing such that the amount of image processing for correcting the image quality is larger when the tilt position of the photographing lens is the fourth tilt position than when the tilt position of the photographing lens is the third tilt position.

20. The image pickup apparatus according to claim 17, wherein the third tilt position is closer to a zenith position of the cover member than to the fourth tilt position, or the third tilt position is the zenith position of the cover member.

21. The image pickup apparatus according to claim 18, wherein the image processing circuit makes the amount of image processing for correcting the image quality equal between the case where the cover member is attached to said holding mechanism and the case where the cover member is not attached to said holding mechanism, when the tilt position of the photographing lens is the third tilt position.

* * * * *